(12) United States Patent
Srinivas et al.

(10) Patent No.: US 8,072,329 B1
(45) Date of Patent: Dec. 6, 2011

(54) VOLTAGE REGULATORS USING A RESISTIVE CHAIN TO BIAS A NATIVE TRANSISTOR

(75) Inventors: Shailendra Srinivas, Seattle, WA (US); Jay A. Kuhn, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 620 days.

(21) Appl. No.: 12/326,750

(22) Filed: Dec. 2, 2008

Related U.S. Application Data (60) Provisional application No. 61/088,287, filed on Aug. 12, 2008.

(51) Int. Cl.
*G08B 13/14* (2006.01)

(52) U.S. Cl. ............. 340/572.1; 340/572.4; 340/636.17; 340/10.33; 340/10.34; 375/316; 455/343.1; 455/343.3; 323/224; 323/228; 323/281

(58) Field of Classification Search .... 340/572.1–572.9, 340/636.17, 10.1, 10.33, 10.34, 645; 323/224, 323/228, 280–284; 324/426–428; 375/316; 455/343.1, 343.3

See application file for complete search history.

(56) References Cited

U.S. PATENT DOCUMENTS

| | | | |
|---|---|---|---|
| 7,167,090 B1 * | 1/2007 | Mandal et al. ............ | 340/538.14 |
| 7,538,673 B2 * | 5/2009 | Balachandran et al. ... | 340/572.1 |
| 2004/0195593 A1 * | 10/2004 | Diorio et al. .................. | 257/202 |
| 2006/0128345 A1 * | 6/2006 | Ootaka et al. ................. | 455/333 |

* cited by examiner

*Primary Examiner* — George Bugg
*Assistant Examiner* — Sisay Yacob
(74) *Attorney, Agent, or Firm* — Turk IP Law, LLC (57) ABSTRACT

The present disclosure provides examples of a voltage regulator for a Radio Frequency Identification tag circuit. The voltage regulator includes a pair of native transistors. A first native transistor is coupled to a reference voltage and biased to saturation. A resistive element coupled between the gate and the drain of the transistor ensures a sufficient voltage difference between the source and the drain of the first native transistor. The second native transistor, with a gate coupled to the gate of the first native transistor, outputs a regulated voltage.

24 Claims, 12 Drawing Sheets

*RFID SYSTEM*

FIG. 2

*RFID TAG*

VOLTAGE REGULATORS USING A RESISTIVE CHAIN TO BIAS A NATIVE TRANSISTOR

CROSS-REFERENCE TO RELATED APPLICATION

This application claims the benefit of the priority date of U.S. Provisional Application Ser. No. 61/088,287, filed Aug. 12, 2008, which application is hereby incorporated by reference in its entirety for any purpose.

TECHNICAL FIELD

This invention relates to circuits and methods for voltage regulation, and embodiments of the invention may find use in RFID systems.

BACKGROUND

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on. Accordingly, when a reader reads a tag code, data can be learned about the associated item that hosts the tag, and/or about the tag itself.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

Components of the RFID tag may require a voltage for proper operation. If the voltage provided varies, components of the RFID tag may not operate properly. Accordingly, a voltage regulator may be provided to regulate the provided voltage and reduce variations in the voltage. Conventional regulators may include an operational amplifier with feedback. The regulated voltage is fed back to the operational amplifier, which adjusts the regulated voltage based on a reference voltage. Such a feedback approach can be slow to respond to changes in the provided voltage because it takes time to receive the feedback voltage and make the output adjustment.

Figure 1:
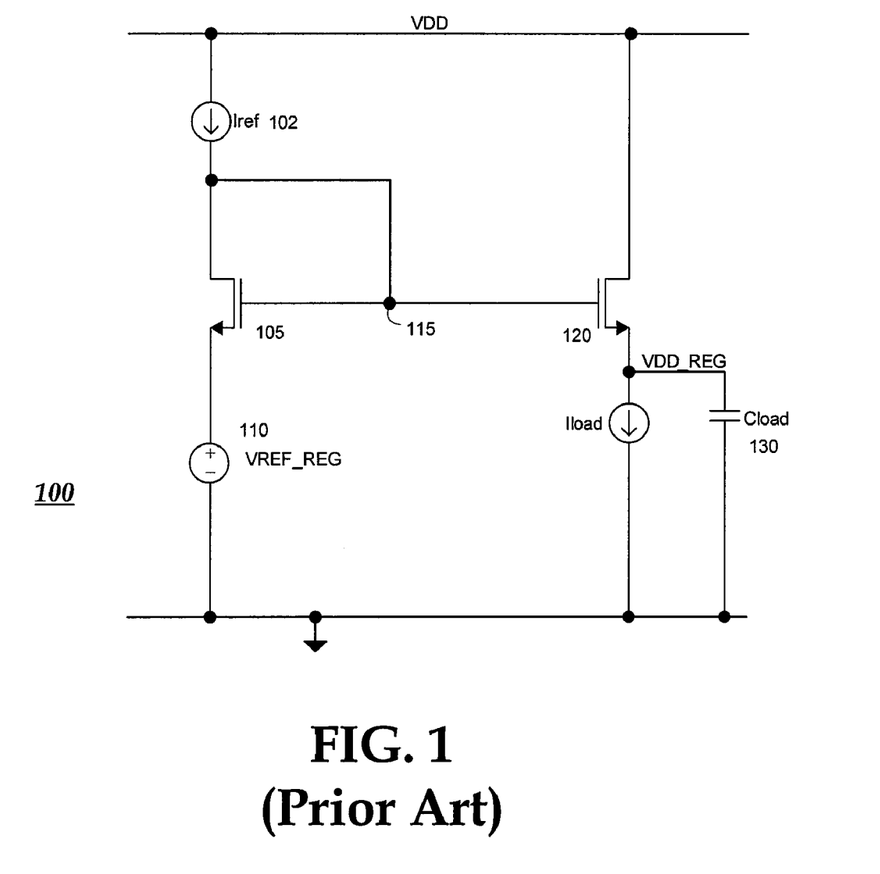
FIG. 1 is a schematic diagram of a source follower voltage regulator according to the prior art.

A source follower circuit 100 may also be used as a voltage regulator, as shown in FIG. 1. A current source $I_{ref}$ 102 is coupled to the drain of the transistor 105 and provided to bias the transistor 105. The transistor 105 is biased to be in saturation. A voltage source 110 having a value $V_{REF\_REG}$ is coupled between the source of the transistor 105 and ground, establishing the voltage at the drain of transistor 105. With the gate and drain of transistor 105 coupled together and the current source $I_{ref}$ supplying current, the transistor 105 is forced into the saturation region of operation. The voltage at the gate, node 115 in FIG. 1, is greater than $V_{REF\_REG}$ by the threshold voltage of the transistor 105, which may be approximately 500 or 600 mV in one example. The gate of the transistor 105 is coupled to the gate of a second transistor 120, which may be larger or smaller than the transistor 105 by a factor m. The voltage on the gate of transistor 120, generated by the transistor 105, controls the conductivity of the transistor 120 to generate a regulated voltage, $V_{DD\_REG}$ as shown in FIG. 1, at the source of the transistor 120. The regulated voltage may be supplied to a load, represented in FIG. 1 as load current 125 and capacitance 130.

Using the voltage regulator of FIG. 1, the supply voltage $V_{DD}$ must be greater than the voltage $V_{REF\_REG}$ by at least a threshold voltage of the transistor 105, which as described, may be approximately 500 or 600 mV. This extra 500 or 600 mV above the desired regulated voltage may be referred to as "overhead," which is desirable to be minimized for low-power operation.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known circuits, control signals, timing protocols, and software operations have not been shown in detail in order to avoid unnecessarily obscuring the described embodiments of the invention.

Figure 2:
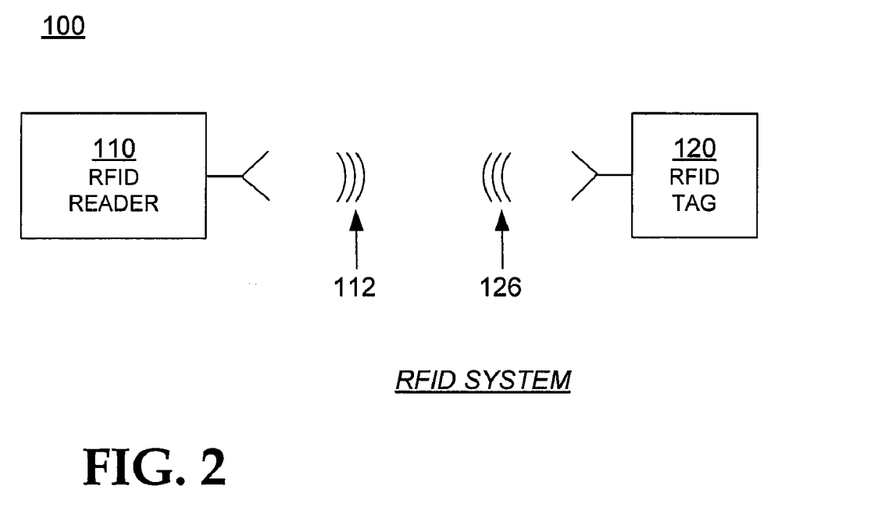
FIG. 2 is a block diagram of components of an RFID system according to embodiments.

FIG. 2 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data is modulated onto, and demodulated from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e., having its own power source. Where tag 120 is a passive tag, it is powered from wave 112.

Figure 3:
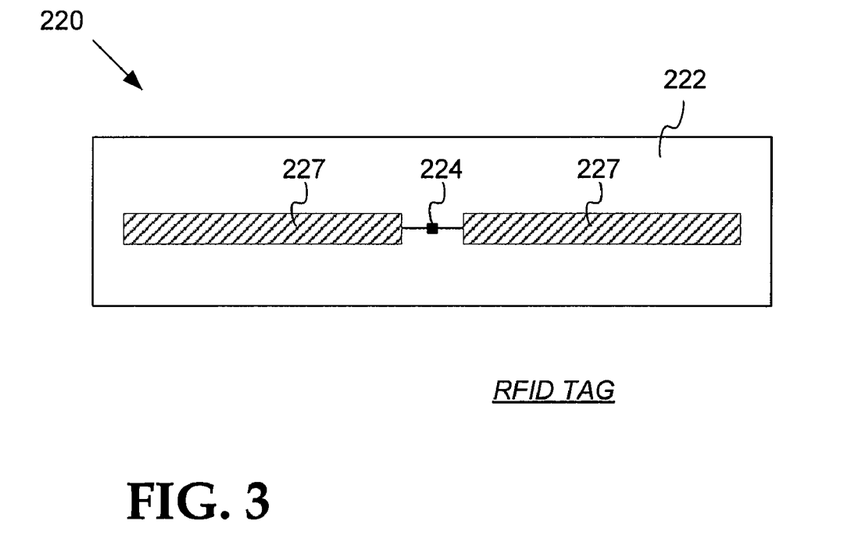
FIG. 3 is a diagram showing components of a passive RFID tag, such as a tag that can be used in the system of FIG. 2.

FIG. 3 is a diagram of an RFID tag 220, which can be the same as tag 120 of FIG. 2. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 3).

The antenna may be made in a number of ways, as is well known in the art. In the example of FIG. 3, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 3, antenna segments 227 are separate from IC 224. In other embodiments, antenna segments may alternately be formed on IC 224, and so on.

The components of the RFID system of FIG. 2 may communicate with each other in any number of modes. One such mode is called full duplex. Another such mode is called half-duplex, and is described below.

Figure 4:
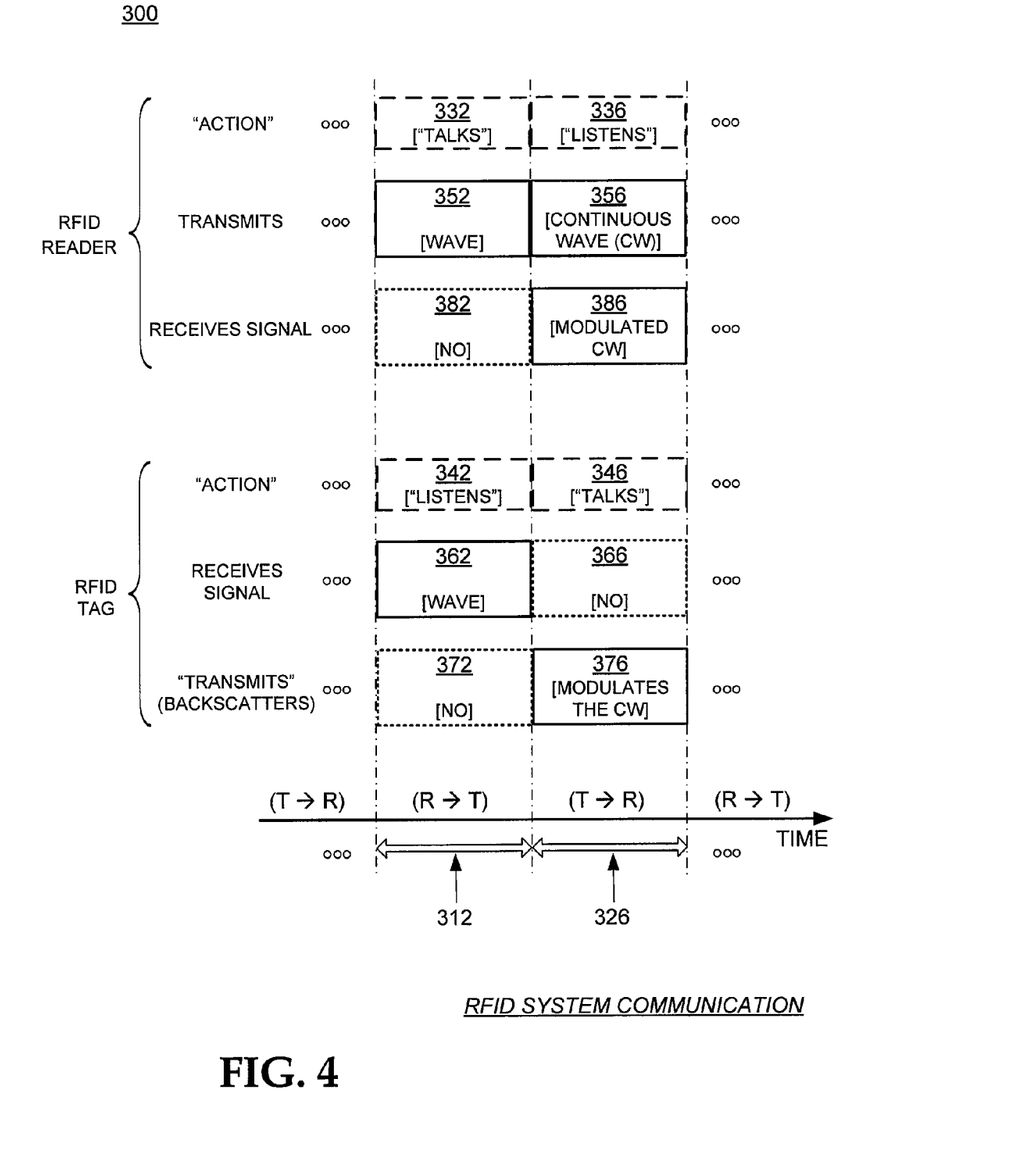
FIG. 4 is a conceptual diagram for explaining a half-duplex mode of communication between the components of the RFID system of FIG. 2.

FIG. 4 is a conceptual diagram 300 for explaining the half-duplex mode of communication between the components of the RFID system of FIG. 2, especially when tag 120 is implemented as passive tag 220 of FIG. 3. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326— here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 2. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are described in protocols. A protocol is a specification that calls for specific manners of signaling between the reader and the tags.

One such protocol is called the Specification for RFID Air Interface—EPC (TM) Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO.

In addition, a protocol can be a variant of a stated specification such as the Gen2 Spec, for example including fewer or additional commands than the stated specification calls for, and so on. In such instances, additional commands are sometimes called custom commands.

It was described above how reader 110 and tag 120 communicate in terms of time. In addition, communications between reader 110 and tag 120 may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

Reader 110 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 120 can respond with a backscatter that is modulated directly onto the frequency of the reader's emitted CW, also called baseband backscatter. Alternatively, tag 120 can respond with a backscatter that is modulated onto a frequency, developed by tag 120, that is different from the reader's emitted CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

A number of jurisdictions require a reader to hop to a new channel on a regular basis. When a reader hops to a new channel it may encounter RF energy there that could interfere with communications.

Embodiments of the present disclosure can be useful in different RFID environments, for example, in the deployment of RFID readers in sparse- or dense-reader environments, in environments with networked and disconnected readers such as where a hand-held reader may enter the field of networked readers, in environments with mobile readers, or in environments with other interference sources. It will be understood that the present embodiments are not limited to operation in the above environments, but may provide improved operation in such environments.

Figure 5:
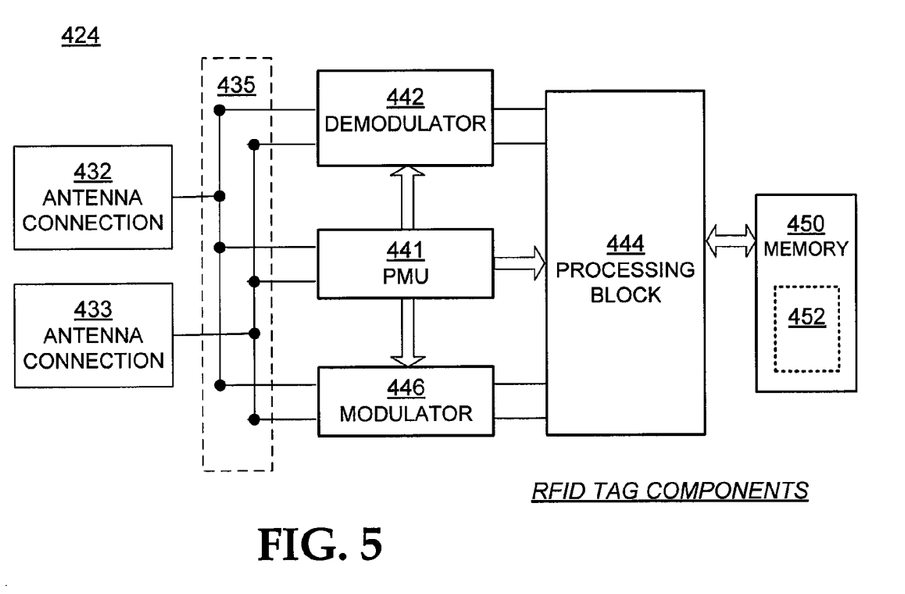
FIG. 5 is a block diagram of an implementation of an electrical circuit formed in an IC of the tag of FIG. 3.

FIG. 5 is a block diagram of an electrical circuit 424. Circuit 424 may be formed in an IC of an RFID tag, such as IC 224 of FIG. 3. Circuit 424 has a number of main components that are described in this document. Circuit 424 may have a number of additional components from what is shown and described, or different components, depending on the exact implementation.

Circuit 424 includes at least two antenna connections 432, 433, which are suitable for coupling to one or more antenna segments (not shown in FIG. 5). Antenna connections 432, 433 may be made in any suitable way, such as using pads and so on. In a number of embodiments more than two antenna connections are used, especially in embodiments where more antenna segments are used.

Circuit 424 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 424 also includes a Power Management Unit (PMU) 441. PMU 441 may be implemented in any way known in the art, for harvesting raw RF power received via antenna connections 432, 433. In some embodiments, PMU 441 includes at least one rectifier, and so on. The PMU may also provide regulated power to the processing block 444 to power digital logic or other components of the processing block. The PMU may contain embodiments of circuits described below to generate the regulated power.

In operation, an RF wave received via antenna connections 432, 433 is received by PMU 441, which in turn generates power for components of circuit 424. This is true for either or both reader-to-tag (R→T) and tag-to-reader (T→R) sessions, whether or not the received RF wave is modulated.

Circuit 424 additionally includes a demodulator 442. Demodulator 442 demodulates an RF signal received via antenna connections 432, 433. Demodulator 442 may be implemented in any way known in the art, for example including an attenuator stage, an amplifier stage, and so on.

Circuit 424 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, memory, a decoder, an encoder, and so on.

Circuit 424 additionally includes a modulator 446. Modulator 446 modulates an output signal generated by processing block 444. The modulated signal is transmitted by driving antenna connections 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 424 additionally includes a memory 450, which stores data 452. Memory 450 is preferably implemented as a Nonvolatile Memory (NVM), which means that data 452 is retained even when circuit 424 does not have power, as is frequently the case for a passive RFID tag.

An RFID tag system has been described above. As described, the RFID tag may include a power management unit (PMU) that supplies regulated power to the processing block 444. Circuits and methods for providing regulated power will now be described.

As was described above with reference to FIG. 1, a source follower voltage regulator may have improved startup time relative to an operational amplifier-based voltage regulator. However, the prior art source follower voltage regulator 100 shown in FIG. 1 requires the supply voltage $V_{DD}$ to be approximately 500 or 600 mV greater than the voltage to be regulated $V_{REF\text{-}REG}$. Embodiments of the present invention may reduce the overhead required for operation of a voltage regulator.

Figure 6:
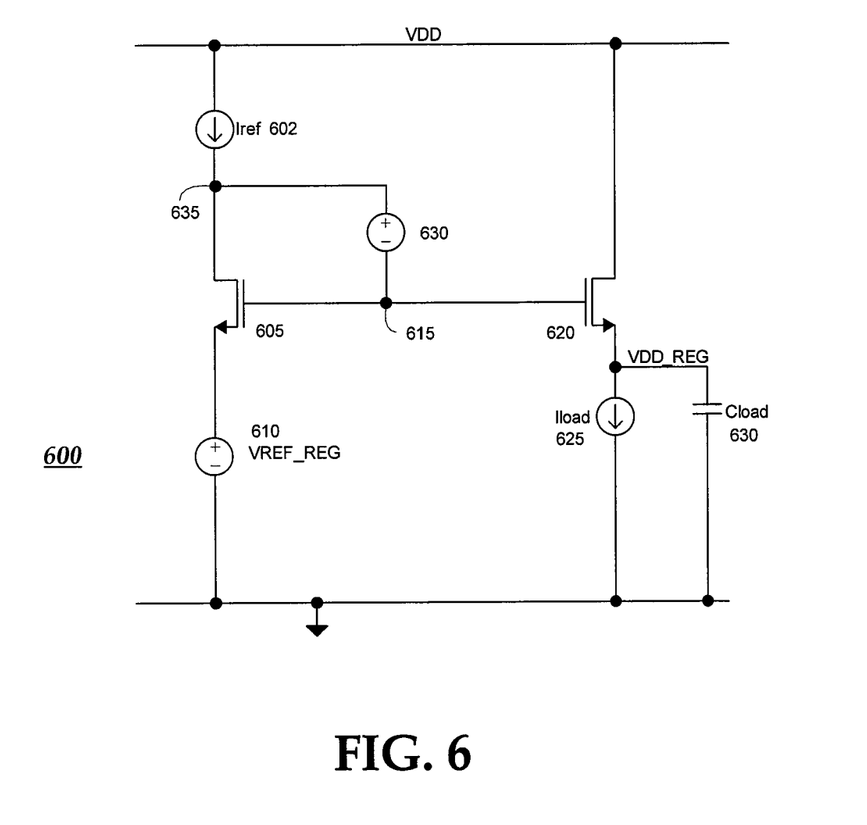
FIG. 6 is a schematic diagram of a voltage regulator according to an embodiment of the present invention.

FIG. 6 depicts a schematic of a voltage regulator 600 according to an embodiment of the present invention. The voltage regulator 600 utilizes native transistors. A native transistor is fabricated differently than a typical transistor device in that it does not undergo the same channel doping process normally used to set a threshold voltage of the transistor, and may not undergo any channel doping process at all. Accordingly, a native transistor relies more heavily, or in some embodiments completely, on the intrinsic body characteristics of the semiconductor material in which the transistor is formed, to set the threshold voltage. Accordingly, a native transistor has a lower threshold voltage than a typical transistor. A native transistor generally has a threshold voltage of 100 mV or less, and may have a negative threshold voltage. NMOS native transistors 605 and 620 are used that have near-zero threshold voltages. The native transistors 605 and 620 are transistors formed in a semiconductor region, the channel of which has not undergone surface enhancement or depletion to set or enhance the threshold voltage. The channel is therefore formed directly on the surface of the semiconductor region without ion implantation or diffusion after well formation. The native transistors 605 and 620 may accordingly have a threshold voltage of 100 mV or less. The NMOS transistor 620 may be larger than the NMOS transistor 605 by a factor m. The voltage to be regulated, $V_{REF\_REG}$, is coupled to the drain of the transistor 605 and a current source $I_{ref}$ 602 is provided to bias the transistor 605. Recall that the transistor 605 is a native transistor, having a small, or possibly a negative, threshold voltage. Because the threshold voltage of the transistor 605 may be negative, it may be undesirable to couple the gate of the transistor 605 directly to its drain, as was done in the prior art regulator shown in FIG. 1. Instead, a voltage source 630 is coupled between the gate and the drain of the transistor 605. The voltage source 630 may be small, around 100 mV, to keep the transistor 605 in the saturation region of operation.

The voltage source 630 ensures that the voltage at node 635 is slightly higher than $V_{REF\_REG}$, even if the voltage at node 615 is lower due to a negative threshold voltage of the transistor 605. The voltage at the gate of the transistor 605 is coupled to the gate of the transistor 620, and controls the conductivity of the transistor 620 to generate the regulated voltage $V_{DD\_REG}$ at the source of the transistor 620. The regulated voltage may be supplied to a load, shown in FIG. 6 as including a load current and capacitance 625 and 640. In this manner, the voltage $V_{DD}$ supplied to the circuit 600 need only be larger than $V_{REF\_REG}$ by the small voltage 630 and any positive threshold voltage of the transistor 605. The circuit 600 accordingly may save overhead relative to the circuit of FIG. 1.

The circuit 600, shown in FIG. 6 and described above, illustrates how a lower overhead voltage regulator may be achieved. Implementation of the voltage source 630 will now be described. The voltage source 630 may be implemented in such a way as to minimize overhead and power consumption of the circuit 600.

Figure 7:
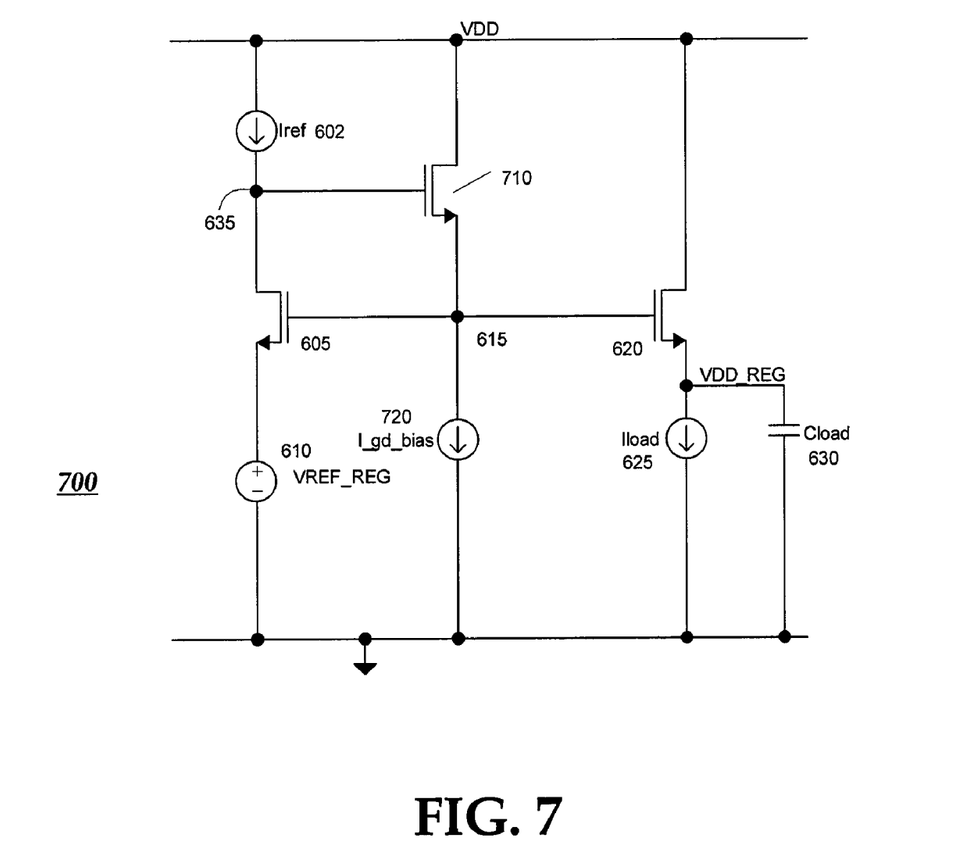
FIG. 7 is a schematic diagram of a voltage regulator according to another embodiment of the present invention.

FIG. 7 is a schematic illustration of a voltage regulator 700 according to another embodiment of the present invention, and illustrates one manner in which the voltage source 630 may be implemented. A transistor 710 has its source coupled to node 615, the gates of the transistors 605 and 620. The gate of the transistor 710 is coupled to the drain of the transistor 605. A current source 720 is provided to bias the transistor 710 in saturation. Accordingly, the transistor 710 sets the voltage at node 635 to be higher than the voltage at node 615 by the threshold voltage of the transistor 710. While this approach may ensure a voltage difference between the nodes 635 and 615, the threshold voltage of the transistor 710 is likely on the order of 500 or 600 mV, increasing the overhead of the circuit 700. Methods and circuits for establishing a voltage difference between the gate and drain of the native transistor with less overhead will be described further below.

Figure 8:
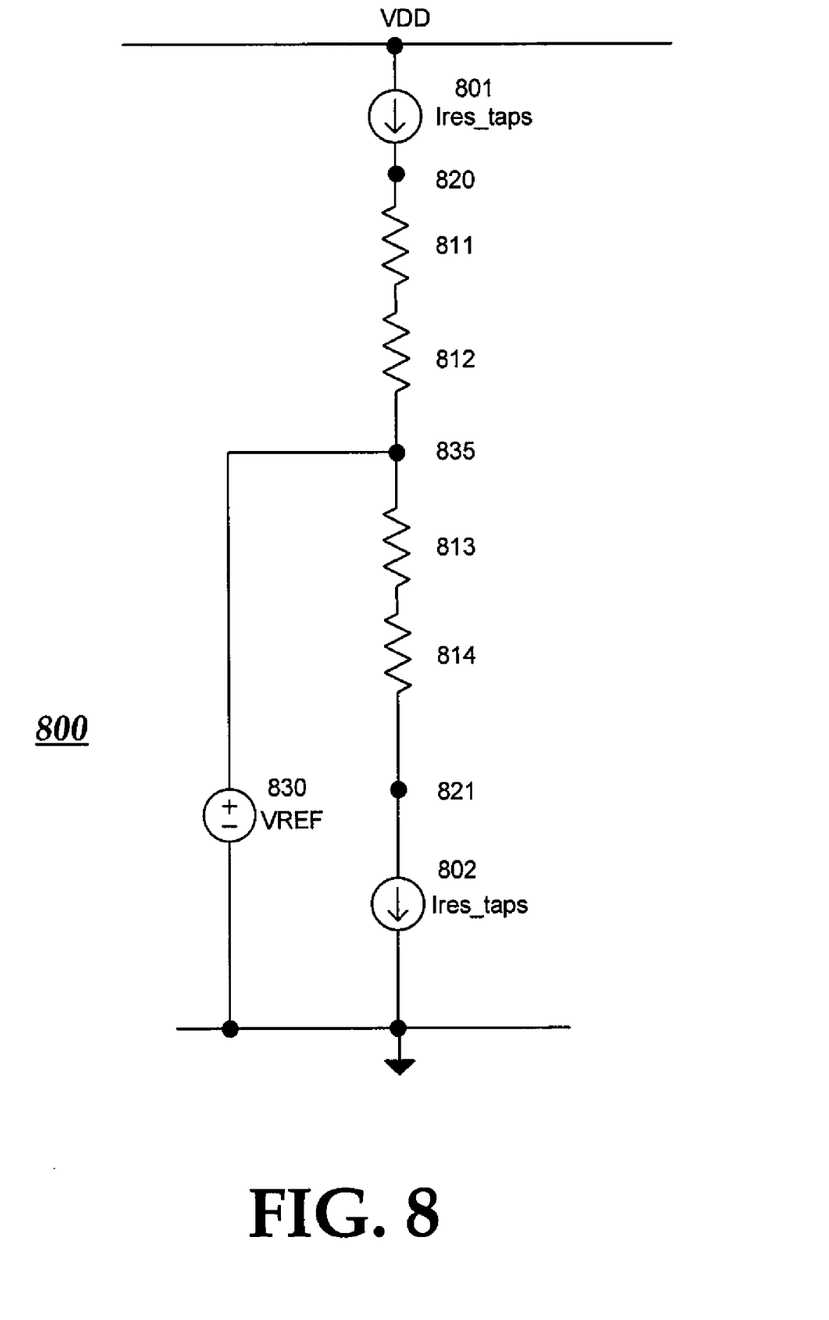
FIG. 8 is a schematic diagram of a resistive chain that may be used to set the voltage difference between the gate and the drain of the transistor 605.

FIG. 8 is a schematic illustration of a resistive string circuit 800 that may be used to set the voltage difference between the gate and the drain of the transistor 605. Current sources 801 and 802 supply current to resistors 811, 812, 813, and 814. Although four resistive elements are shown in FIG. 8, any number may be used. Further, although resistors are shown in FIG. 8 any type of element having a resistance may be used, as will be further described below. The current passing through the resistive elements 811-814 causes a predictable voltage drop across each element. However, the precise voltage at nodes 820 and 821 may not be known. Accordingly, a reference voltage 830 coupled to a node 835 to set the voltages between all resistive elements. Although the reference voltage is shown coupled to the node 835, it could be coupled anywhere along the resistive chain between nodes 820 and 821, and including nodes 820 and 821. Accordingly, based on the reference voltage 830 and the current passed by current sources 801, and 802, and the resistance of the resistive elements 811-814, the voltage may be known at any point from the node 820 and 821.

Figure 9:
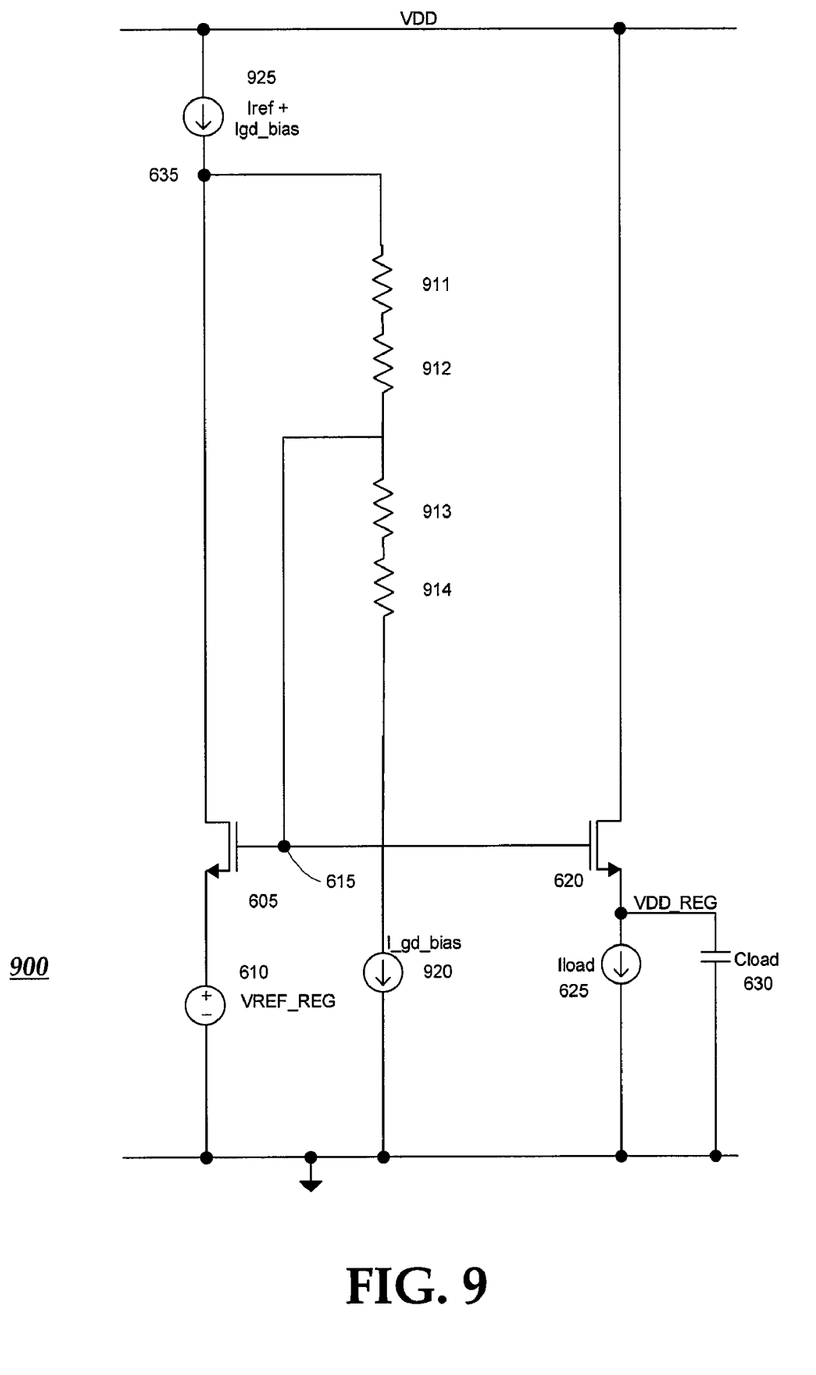
FIG. 9 is a schematic diagram of a voltage regulator according to another embodiment of the present invention.

FIG. 9 is a schematic diagram of a voltage regulator 900 implementing a resistive chain to set the voltage between the gate and the drain of the transistor 605. The voltage generated on the gate of the transistor 605 serves as the reference voltage to establish the voltages along the chain of resistive elements 911-914. The resistive elements 911-914 are coupled between the node 635 and the current source 920, pulling current $I_{gd\_bias}$. The current source 925 accordingly sources the current $I_{ref}$ and $I_{gd\_bias}$. In this manner, the current $I_{gd\_bias}$ flowing through the resistive elements 911 and 912 establishes a voltage difference between the nodes 635 and 615. The voltage difference may be smaller than the 500 or 600 mV transistor threshold voltage described above, and may be about 50 mV. The additional current required $I_{gd\_bias}$ is small and may be around 10 nanoamps.

Figure 10:
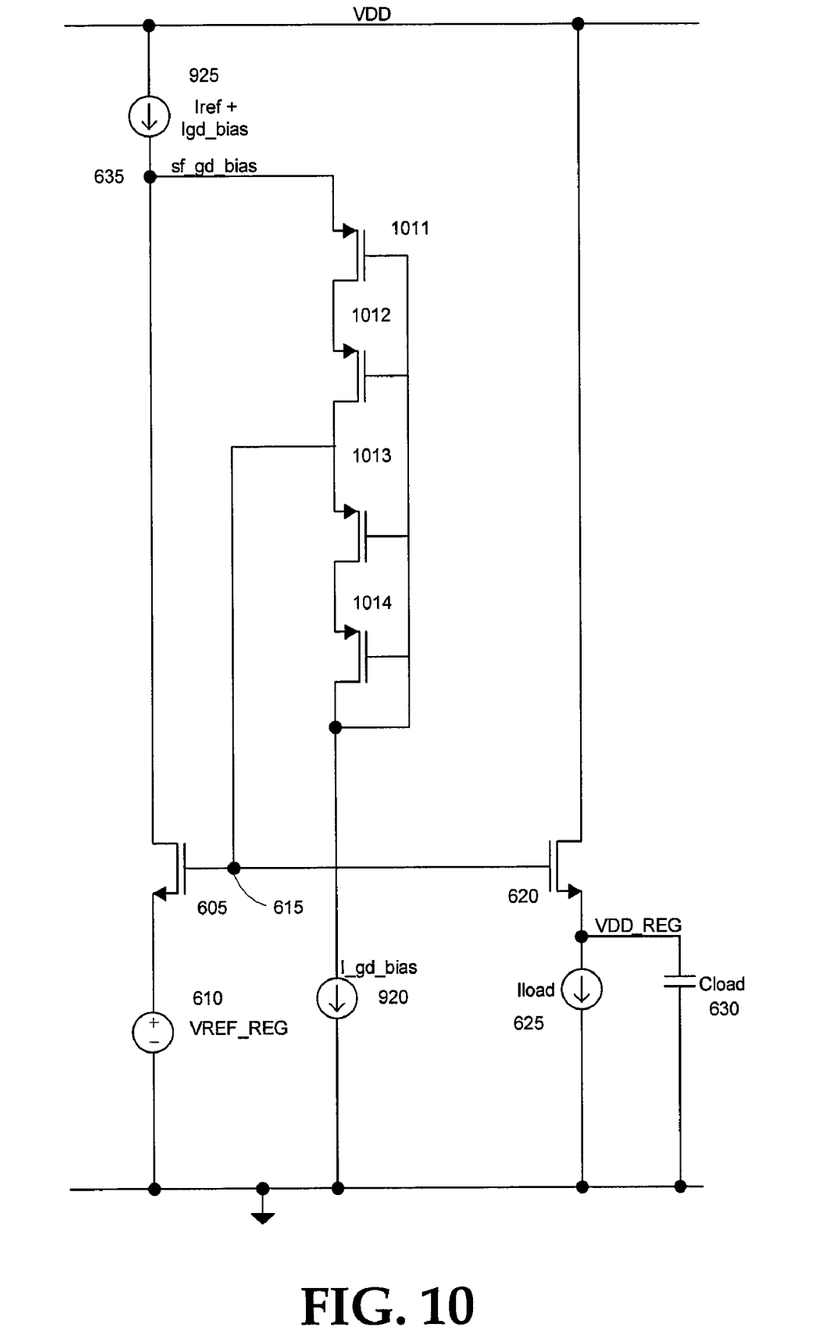
FIG. 10 is a schematic diagram of a voltage regulator according to another embodiment of the present invention.

The use of resistors to form resistive elements 911-914 and set the voltages at nodes 635 and 615 may consume a large amount of area on an integrated circuit chip on which the regulator 900 is formed. Accordingly, other elements may be used to implement the resistive elements 911-914. For example, FIG. 10 is a schematic diagram of a voltage regulator 1000 implementing a resistive chain employing transistors instead of resistors as the resistive elements 1011-1014.

Figure 11:
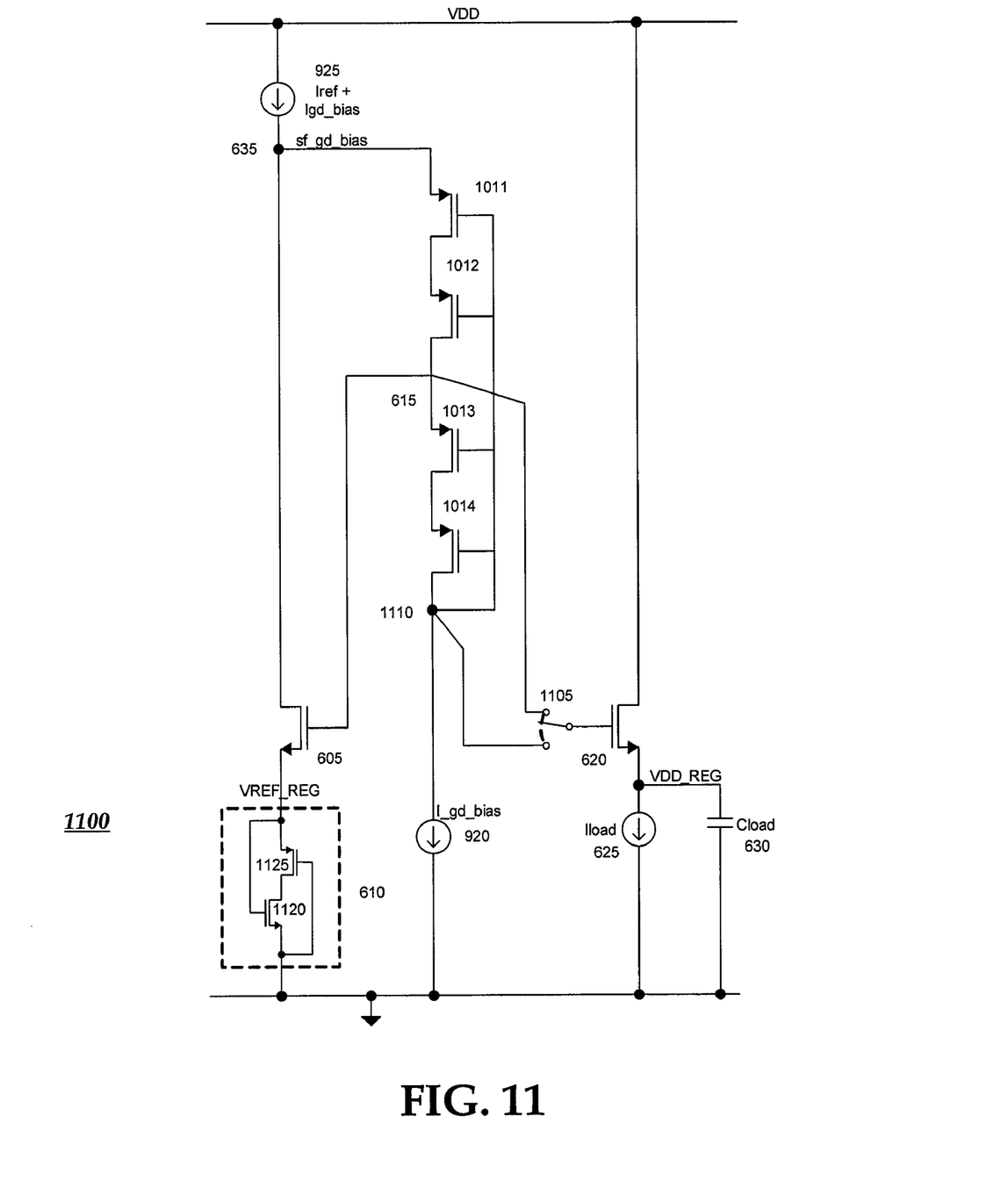
FIG. 11 is a schematic diagram of a voltage regulator according to another embodiment of the present invention.

As described above, when a chain of resistive elements is used to set a voltage difference between the source and drain of the transistor 605, different voltages are established between each resistive element at each end of the chain. These points can be referred to as taps where the different voltages are available. Voltages at any tap along the chain may be used by components of the power management unit of FIG. 4. Additionally, switches may be provided to switch between different taps. FIG. 11 is a schematic illustration of a voltage regulator 1100 employing a switch 1105 coupled to the gate of the transistor 620. The switch 1105 has two positions. In the first position, the switch 1105 couples the transistor gate to the node 615, as in FIG. 10. In the second position, the switch 1105 couples the gate of the transistor 620 to the node 1110. When the gate of the transistor 620 is coupled to the node 615, the voltage $V_{DD\_REG}$ is output from the voltage regulator 1100. When the gate of the transistor 620 is coupled to the node 1110, a different, lower, voltage is output from the voltage regulator 1100. Although a single switch with two positions is shown, any number of switches having a number of positions may be used to switch between all different taps available in the resistive chain.

The switch 1105 may be implemented in a variety of ways, including but not limited to, fuse technologies, analog switches that may be digitally controlled by, for example, reading a control value from a non-volatile memory or from a digital state machine. For example, in one embodiment, a higher voltage may be needed during startup, accordingly the switch 1105 couples the gate of the transistor 620 to the higher voltage at node 615. Following a start-up time, the switch 1105 couples the gate of the transistor 620 to the lower voltage at the node 1110. In other embodiments, the tap coupled to the gate of the transistor 620 may be selected through a mask trimming process or an antifuse provided on the integrated circuit to select a tap during the manufacturing process.

In some embodiments further source follower circuits may be coupled to other taps in the resistive chain. In this manner, a plurality of regulated voltages may be produced, one from each node in the resistive chain.

FIG. 11 also illustrates an implementation of the voltage reference 610 $V_{REF\_REG}$. The voltage reference 610 may be provided in any manner including, but not limited to, a resistor, a zener diode, a bi-polar diode, a NPN or PNP transistor connected as a diode, a NMOS or PMOS transistor connected as a diode, an NMOS and PMOS transistor pair connected as a diode, or a bandgap reference device built from native transistors. Other reference voltages may also be used. The embodiment in FIG. 11 illustrates the voltage reference 610 implemented as an NMOS and PMOS transistor pair 1120 and 1125 connected as a diode. The source of the NMOS transistor 1120 is coupled to the gate of the PMOS transistor 1125. The source of the PMOS transistor 1125 is coupled to the gate of the NMOS transistor 1120. The connection of the NMOS and PMOS transistors 1120 and 1125 thus provides a voltage that is the maximum of the NMOS or PMOS threshold. If the PMOS transistor 1125 threshold voltage is higher than the NMOS transistor 1120 threshold voltage, the voltage at $V_{REF-REG}$ is the PMOS threshold voltage and any "overdrive" voltage. The NMOS device will be biased well above its threshold and goes out of saturation, playing no significant role. The opposite is true when the NMOS transistor 1120 threshold voltage is higher than the PMOS transistor threshold. The $V_{REF\_REG}$ will be equal to the NMOS threshold voltage plus any overdrive.

Figure 12:
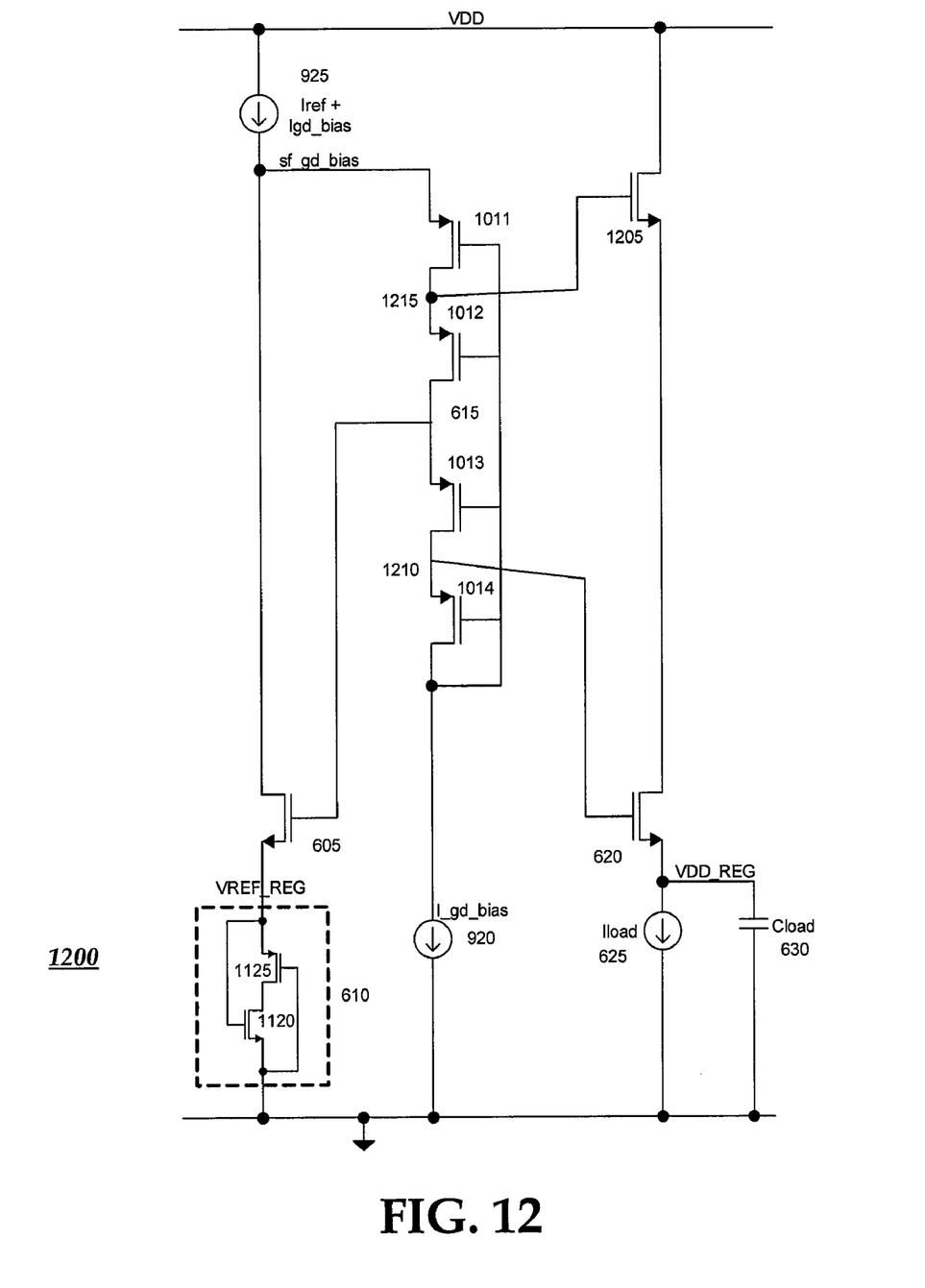
FIG. 12 is a schematic diagram of a voltage regulator employing a cascode transistor according to another embodiment of the present invention.

FIG. 12 is a schematic illustration of a voltage regulator employing a cascoded transistor 1205. The gate of the output transistor 620 is coupled to a first tap of the resistive chain at a node 1210. The gate of the cascoded transistor 1205 is coupled to another tap of the resistive chain at a node 1215. The source of the transistor 1205 is coupled to the drain of the output transistor 620. The cascoded transistor 1205 is also a native transistor, and may be turned on by the voltage supplied from the node 1215. The cascoded transistor 1205 reduces the impact of power supply noise on the output, $V_{DD\_REG}$ by decoupling the drain of the transistor 620 from the power supply $V_{DD}$.

Figure 13:
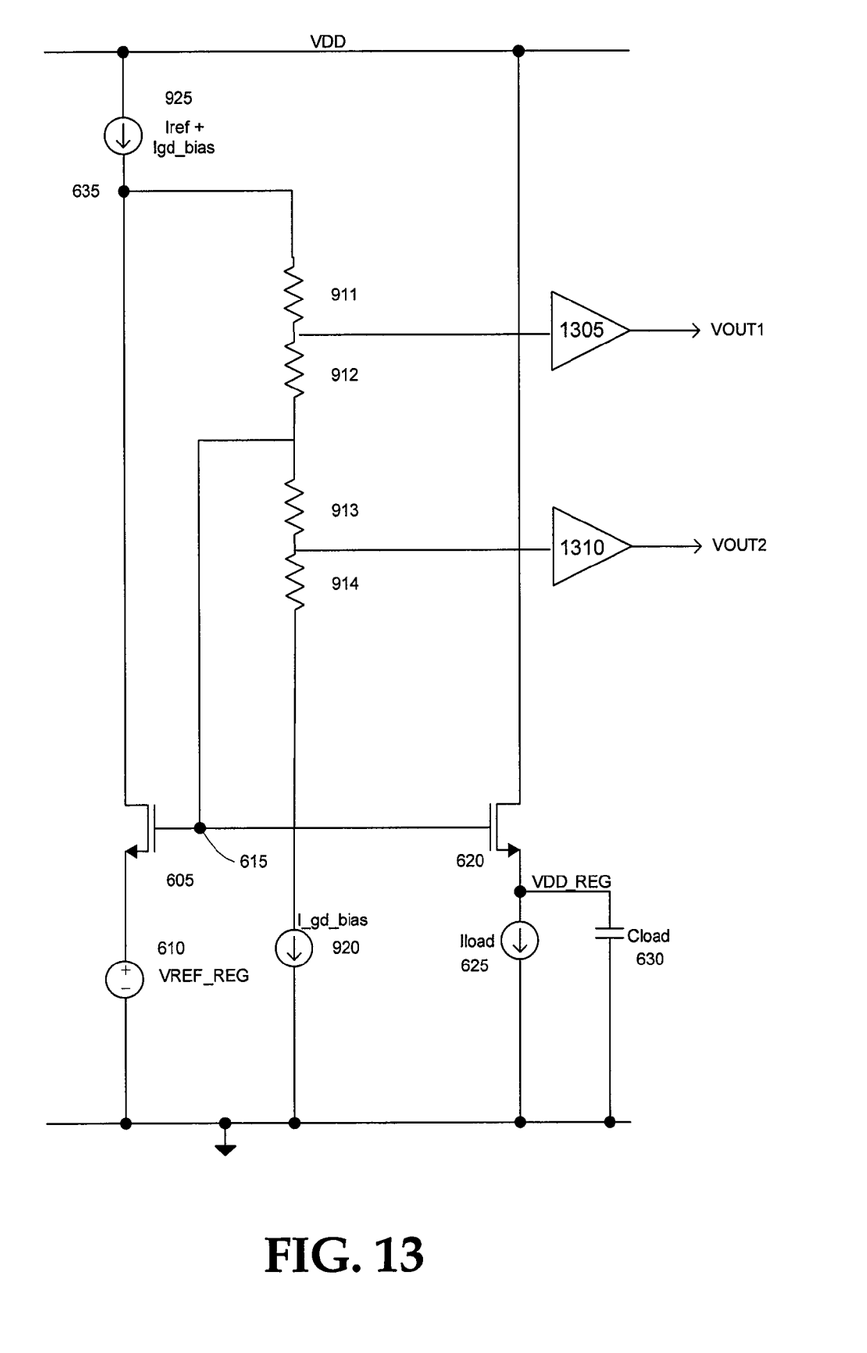
FIG. 13 is a schematic diagram of a voltage regulator according to another embodiment of the present invention.

FIG. 13 is a schematic illustration of the voltage regulator 900 of FIG. 9 configured to generate several output voltages. As was described with reference to FIG. 11, a single output voltage ($V_{DD\_REG}$) may be connected to a plurality of different taps in a resistive chain, to allow for switching between multiple possible output voltages. The embodiment shown in FIG. 13 illustrates how the resistive chain may provide multiple output voltages simultaneously. The transistor 620 remains coupled to the node 615 to generate $V_{DD\_REG}$. However, additional regulators 1305 and 1310 are provided coupled to different locations in the resistive chain to generate two additional output voltages $V_{OUT1}$ and $V_{OUT2}$, respectively.

The regulators 1305 and 1310 are shown implemented as operational amplifiers, however other implementations may be used such as a transistor in a source follower configuration, similar to the transistor 620. Each of the output regulators 620, 1305, and 1310 may also be connected to a respective switch (not shown) to switch between different tap points in the resistive chain. Generating multiple outputs may allow a regulated voltage to be coupled to two downstream circuits while reducing the effect of noise generated by one circuit on another. That is, the effect of noise coupling between two downstream circuits may be reduced if the two circuits are provided a regulated voltage from different outputs of the voltage regulator shown in FIG. 9 rather than a same output.

Embodiments of the invention described above have employed NMOS transistors as the input and output transistor of the source follower voltage regulator configuration. However, in other embodiments, PMOS transistors may be used with VDD and GND swapped in the Figures. Such embodiments may generate an output voltage that is referenced to VDD instead of GND.

From the foregoing it will be appreciated that, although specific embodiments of the invention have been described herein for purposes of illustration, various modifications may be made without deviating from the spirit and scope of the invention.

What is claimed is:

1. A Radio Frequency Identification tag circuit, comprising:
   a first antenna input node configured to receive wirelessly an alternating signal;
   a power management unit coupled to the first antenna input node, the power management unit including a voltage regulator including:
   a first native transistor having a first threshold voltage, the first native transistor having a first gate terminal, and a second and third terminal;
   a reference voltage source coupled to the second terminal of the first native transistor;
   a resistive element coupled between the first gate terminal of the first native transistor and the third terminal of the first native transistor;
   a first current source coupled to the third terminal of the first native device;
   a second current source coupled to the first gate terminal of the first native transistor;
   the current sources coupled to the first resistive element such that the resistive element establishes a voltage difference between the first gate terminal and the third terminal of the first native transistor such that the first native transistor is in a saturation region of operation; and
   a second native transistor having a second threshold voltage, the second native transistor having a first gate terminal, and a second and third terminal, the first gate terminal of the second transistor coupled to the first gate terminal of the first transistor, the second native transistor is configured to generate a regulated voltage at the second terminal of the second native transistor, the regulated voltage based in part on the reference voltage.

2. The radio frequency identification tag circuit of claim 1 in which the second transistor is larger than the first transistor by a factor m.

3. The radio frequency identification tag circuit of claim 1 in which at least one of the first and second threshold voltages is 100 mV or less.

4. The radio frequency identification tag circuit of claim 1 in which at least one of the first and second threshold voltages is approximately zero.

5. The radio frequency identification tag circuit of claim 1 in which at least one of the first and second threshold voltages is a negative threshold voltage.

6. The radio frequency identification tag circuit of claim 1 in which the first and second native transistors are NMOS transistors.

7. The radio frequency identification tag circuit of claim 1 in which the first and second native transistors are PMOS transistors.

8. The radio frequency identification tag circuit of claim 1 in which first current source is further configured to bias the first transistor into a saturation region of operation.

9. The radio frequency identification tag circuit of claim 1 in which the voltage difference between the first gate terminal and the third terminal of the first native transistor is sufficient to keep the first native transistor in saturation.

10. The radio frequency identification tag circuit of claim 1 in which the voltage difference between the first gate terminal and the third terminal of the first native transistor is approximately 50 mV.

11. The radio frequency identification tag circuit of claim 10 in which the current supplied by the current source is 10 nanoamps or less.

12. The radio frequency identification tag circuit of claim 1 in which the resistive element includes a resistor.

13. The radio frequency identification tag circuit of claim 1 in which the resistive element includes a third transistor.

14. The radio frequency identification tag circuit of claim 13 in which the first and second transistors are NMOS transistors and the third transistor is a PMOS transistor.

15. The radio frequency identification tag circuit of claim 13 in which the first and second transistors are PMOS transistors and the third transistor is an NMOS transistor.

16. The radio frequency identification tag circuit of claim 1 further comprising a plurality of series coupled resistive elements coupled between the third terminal of the first transistor and the first current source, including the first resistive element.

17. The radio frequency identification tag circuit of claim 16 further comprising a switch coupled to the first gate terminal of the second native transistor, the switch configured to couple the first gate terminal of the second native transistor to the first resistive element in a first position and to couple the first gate terminal of the second native transistor to a different position in the series of resistive elements in a second position.

18. The radio frequency identification tag circuit of claim 17 in which the switch comprises at least one of fuse technologies, digitally controlled analog switches, mask trimming processes or combinations thereof.

19. The radio frequency identification tag circuit of claim 16 in which the plurality of series coupled resistive elements comprise transistors having their respective gate terminals coupled together and coupled to the current source.

20. The radio frequency identification tag circuit of claim 16 in which the first gate terminal of the first transistor is coupled to a first node between a first one and a second one of the plurality of resistive elements and the first gate terminal of the second transistor is coupled to a second node different than the first node between two of the plurality of resistive elements.

21. The radio frequency identification tag circuit of claim 20 further comprising a third native transistor having a gate terminal coupled to a third node of the plurality of series coupled resistive elements, the third node different than the first and second nodes, the third native transistor having a second terminal coupled to the third terminal of the second native transistor.

22. The radio frequency identification tag circuit of claim 1 further comprising a third transistor having a first gate terminal and a second and third terminal, the first gate terminal of the third transistor coupled to the first gate terminal of the first transistor, the third transistor configured to generate the regulated voltage at the second terminal of the third transistor, the regulated voltage based in part on the reference voltage.

23. The radio frequency identification tag circuit of claim 16 further comprising a third transistor having a first gate terminal and a second and third terminal, the first gate terminal of the third transistor coupled to a different position in the series of resistive elements than the first gate terminal of the first transistor, the third transistor configured to generate a second regulated voltage at the second terminal of the third transistor, the second regulated voltage based in part on the reference voltage.

24. The radio frequency identification tag circuit of claim 16 further comprising a plurality of output transistors each having a gate terminal coupled to a respective position in the series of resistive elements, each of the plurality of output transistors configured to generate a respective regulated voltage.

\* \* \* \* \*

UNITED STATES PATENT AND TRADEMARK OFFICE
CERTIFICATE OF CORRECTION

| | | |
|---|---|---|
| PATENT NO. | : 8,072,329 B1 | Page 1 of 1 |
| APPLICATION NO. | : 12/326750 | |
| DATED | : December 6, 2011 | |
| INVENTOR(S) | : Srinivas et al. | |

It is certified that error appears in the above-identified patent and that said Letters Patent is hereby corrected as shown below:

Please delete "VREF-REG." in (column 6, line 56) and insert -- VREF_REG. --, therefor.

Please delete "VREF-REG." in (column 9, line 31) and insert -- VREF_REG. --, therefor.

Signed and Sealed this
Twenty-eighth Day of February, 2012

David J. Kappos
*Director of the United States Patent and Trademark Office*